United States Patent [19]

Matsuda et al.

[11] 3,957,501

[45] May 18, 1976

[54] NON-COMBUSTIBLE LIGHT-WEIGHT INORGANIC SHAPED ARTICLES AND PROCESS OF MANUFACTURE

[75] Inventors: Tadashi Matsuda, Hirakata; Kazuo Tanaka, Nagaoka; Kazuma Taura, Osaka, all of Japan

[73] Assignee: Sekisui Kagaku Kogyo Kabushiki Kaisha, Japan

[22] Filed: Sept. 26, 1972

[21] Appl. No.: 292,452

[30] Foreign Application Priority Data
Oct. 2, 1971  Japan.............................. 46-77373

[52] U.S. Cl............................... 106/75; 106/84; 264/42; 264/45.3; 264/54; 264/111; 264/122; 264/DIG. 6; 264/DIG. 17; 264/DIG. 63
[51] Int. Cl.²................. B29D 27/00; C04B 21/00; C04B 35/16
[58] Field of Search........ 264/42, 111, 122, DIG. 6, 264/DIG. 17, DIG. 63, 45.3, 42; 106/75, 84

[56] References Cited
UNITED STATES PATENTS

| | | | |
|---|---|---|---|
| 3,103,254 | 9/1963 | Stedman | 264/42 |
| 3,150,988 | 9/1964 | Dess et al. | 264/42 |
| 3,203,813 | 8/1965 | Gajardo et al. | 106/84 |
| 3,218,683 | 11/1965 | Nishiyama et al. | 106/84 |
| 3,450,547 | 6/1969 | Sams et al. | 106/75 |
| 3,480,509 | 11/1969 | Stein | 264/42 |
| 3,586,747 | 6/1971 | Radtke | 264/111 X |
| 3,707,385 | 12/1972 | Kraemer | 106/75 |
| 3,707,386 | 12/1972 | Kurz | 106/84 |

*Primary Examiner*—Philip Anderson
*Attorney, Agent, or Firm*—Wenderoth, Lind & Ponack

[57] ABSTRACT

A method of producing a non-combustible light-weight shaped article, which comprises shaping a mixture comprising (a) powders of silicon or a silicon alloy, (b) inorganic powders having a porous or hollow structure and (c) water glass, and maintaining the resulting shaped article at a temperature of 15° to 120°C. thereby to foam and cure it.

10 Claims, 2 Drawing Figures

NON-COMBUSTIBLE LIGHT-WEIGHT INORGANIC SHAPED ARTICLES AND PROCESS OF MANUFACTURE

This invention relates to a non-combustible light-weight shaped article suitable especially as structural material.

According to this invention, there is provided a non-combustible light-weight shaped article comprising a foamed and solidified mixture consisting of (a) powders of silicon or a silicon-containing alloy, (b) inorganic powders having a porous or hollow structure and (c) water glass, and further, if desired, (d) a fibrous material and/or (e) a fire-proofness improving agent.

Of late, increased safety of structures and buildings against fire has been demanded more than ever, and the exploitation of non-combustible structural materials that can prevent the occurrence and spreading of fire has been desired. In addition, for construction of higher buildings, structural materials of light weight are required.

Most of the structural materials that have previously been used are combustible, and non-combustible structural materials now in use are heavy in weight requiring an enormous amount of labor in construction work.

Excellent non-combustible structural materials require excellent fire-proofness in addition to being non-combustible themselves. To this end, the non-combustible structural materials must have a number of important properties, among which are: they should not deform, break or come off when exposed to high temperatures; they should not develop cracks that permit flames to pass therethrough, when exposed to high temperatures; after attempt to extinguish fire, the flame on the materials should disappear within short periods of time; they should have excellent heat insulating properties, and even when one surface of the material is exposed to high temperatures, the other surface should be maintained at a relatively low temperature.

However, conventional non-combustible structural materials having superior fire-proofness are heavy in weight, and prove unsuitable for construction of super-high buildings.

It is an object of this invention to provide a method of a non-combustible shaped article which is light in weight and has high mechanical strength such as flexural strength or compression strength and good heat insulating properties.

Another object of this invention is to provide a method of producing a non-combustible shaped article which is light in weight and has superior fire-proofness and high mechanical strength characteristics such as flexural strength and compression strength.

Still another object of this invention is to provide a method of producing such a light-weight non-combustible shaped article continuously.

Many other objects of this invention together with its advantages will become apparent from the following detailed description.

According to this invention, there is provided a method of producing a non-combustible light-weight shaped article which comprises shaping a mixture comprising (a) silicon powders or powders of a silicon alloy, (b) porous or hollow inorganic powders and (c) water glass, and maintaining the shaped article at a temperature of 15° to 120°C. thereby to foam and solidify the shaped article.

When the shaped article of the mixture comprising (a), (b) and (c) is maintained at 15°C, to 120°C. alkali silicate is hydrolyzed by water contained in the water glass to form alkali hydroxide which reacts with the silicon in (a) to evolve hydrogen gas. This hydrogen gas causes the shaped article to foam, and by exothermic reaction occurring at this time, the shaped article solidifies with the evaporation of water. Thus, a light-weight non-combustible shaped is obtained.

Component (a) to be added to the mixture described above is metallic silicon or an alloy containing silicon. The silicon content of such an alloy is not particularly restricted, buy may conveniently be at least 10 % by weight, especially at least 50 % by weight. Examples of the silicon alloy are ferrosilicon, calcium silicide, ferrosilicon aluminum, silicon-manganese-aluminum, calciumsilicon-manganese, silicon manganese, or silicochromium. These are used either alone or in admixture.

Preferably, metallic silicon or the siliconcontaining alloy is used in granular to powdery form. Usually, those having an average particle size of not more than 500 microns, especially not more than 100 microns are preferred. If the average particle size of the powders of silicon or silicon alloy is too large, the sum of the surface areas of the particles that will come into contact with water glass is reduced, which in turn tends to reduce the strength of the resulting shaped article and renders the particles unable to be dispersed fully in the water glass.

The term "porous or hollow inorganic powders" is used herein to denote porous inorganic powders having the "pearlite" structure or hollow spherical inorganic powders called microballoon. These powders are composed of a non-combustible inorganic material which does not easily decompose or disintegrate even at high temperatures. The porosity of the inorganic powders having a porous, or "pearlite", structure is not critical. But suitable porosities are usually from 50 to 99 %, preferably 67 to 98 %.

Examples of the porous or hollow inorganic powders used in the present invention are powders of pearlite rock, obsidian pearlite, pumice microballoon (microballoons of volcanoic ashes and pumices), carbon microballoons, glass microballoons, powders of foamed shale, pumice, foamed clay, and vermicullite. Of these, pearlite rock and glass microballoon are most preferred.

The particle size of the powders is not critical. But those having an average particle diameter of 10 microns to 1000 microns are especially preferred, and those having an average particle size of 50 to 500 microns are most preferred. If those having an average particle diameter of more than 1000 microns are used, they contribute to the light weight of the resulting shaped article, but disadvantageously deteriorate its physical strength. If, on the other hand, those having an average particle diameter of less than 10 microns are used, the physical strength of the resulting shaped article is improved but the weight of the article is difficult to decrease.

The amount of the porous or hollow inorganic powders to be incorporated is not critical, but usually from 100 to 2000 parts by weight, preferably 200 to 800 parts by weight, per 100 parts by weight of the powders of silicon or a silicon alloy. When the amount of the inorganic powders is within this range, the resulting shaped article is light in weight and has good physical strength.

Water glass broadly includes anhydrous water glass (solid alkali silicate glass), but in the present invention, this term is limited to a concentrated aqueous solution of alkali silicate glass in order to utilize the hydrolysis of the alkali silicate. Examples of the water glass that can be used in the present invention are $Na_2O \cdot 2SiO_2$ aqueous solution (Japanese Industrial Standard No. 1), $2Na_2O \cdot 5SiO_2$ aqueous solution (Japanese Industrial Standard No. 2), $Na_2O \cdot 3SiO_2$ aqueous solution (Japanese Industrial Standard No. 3), $Na_2O \cdot 4SiO_2$ aqueous solution (Japanese Industrial Standard No. 4), an aqueous solution of sodium sesquisilicate ($3Na_2O \cdot 2SiO_2$), an aqueous solution of sodium metasilicate ($Na_2O \cdot SiO_2$), an aqueous solution of potassium silicate ($K_2O \cdot SiO_2$), and lithium water glass. Of these, water glasses Nos. 2 and 3 are especially preferred because of their availability, ease of handling and low costs. Suitable water glasses contain about 10 – 30 % of water.

The amount of water glass to be added is not critical, but preferably 100 to 1200 parts by weight, more preferably 200 to 800 parts by weight, per 100 parts by weight of the powders of silicon or a silicon alloy. If the amount of water glass is less than 100 parts by weight, the physical strength of the shaped article is not sufficient, and if it exceeds 1200 parts by weight, the physical strength of the shaped article tends to be reduced.

Fibrous material (d) may be added to the composition comprising (a) silicon or a silicon alloy, (b) porous or hollow organic powders and (c) water glass in order to reinforce the resultant shaped article. For reinforcing purposes, the length of the fibrous material should preferably be not more than 5.0 mm, especially from 2 to 3.0 mm. If the length of the fibers is longer than 5.0 mm, the fibers are intertwined with each other and tend to become difficult to disperse uniformly in the mixture. Fibers having extremely short lengths do not become different from powders, and cannot serve for reinforcing purposes. Accordingly, the fibrous material should have a fiber length of at least 1 mm.

For reinforcing purposes, both organic and inorganic fibers can be used as the fibrous material. However, the use of great quantities of the organic fibers should be avoided since the organic fibers burn, decompose or melt when exposed to high temperatures. When it is desired to use the fibrous material in a relatively large amount, inorganic fibers are used alone or in admixture with inorganic fibers. The addition of a small amount of organic fibers is permissible since they do not adversely affect the non-combustibility of the shaped article. Especially the organic fibers rendered non-combustible or flame-retardant are preferred.

Generally, however, the use of inorganic fibers are recommended. Examples of the inorganic fibers are chrysotile asbestos, hard serpentine asbestos, anthophyllite asbestos, amosite asbestos, tremolite asbestos, actinolite asbestos, crocidolite asbestos, rock wool, slag wool, glass fibers, and metal fibers. Of these, chrysotile asbestos and amosite asbestos are preferred.

The fibrous material can be added in an amount of up to 80 parts by weight per 100 parts by weight of the total amount of components (a), (b) and (c) described above. Preferably, the amount of the fibrous article is 1 to 10 parts. The addition of the fibrous article further improves the mechanical strength characteristics of the shaped article, such as flexural strength or compression strength and also its crack resistance and disintegration resistance.

By adding a fire-proofing agent to the abovementioned mixture, the fire-proofness and heat insulation of the shaped article can be increased.

The "fire-proofing agent" is a non-combustible substance which imparts the resulting non-combustible shaped article the properties of not deforming, breaking or coming off when exposed to high temperatures, not developing creacs that permit flames to pass therethrough, when exposed to high temperatures, permitting the disappearance of flames within short periods of time after attempt to extinguish fire, and having excellent heat insulating properties and causing one surface to be maintained at a relatively low temperature even when the other surface is exposed to high temperatures. For example, inorganic powders having water of crystallization, and inorganic powders which decompose when exposed to high temperatures and absorb heat can be used.

The "inorganic powders having water of crystallization" release water of crystallization when exposed to high temperatures, and by latent heat generated at the time of vaporization of the water molecules, the fire-proofness of the shaped article is increased. Therefore, the larger the amount of water of crystallization, the better. Generally, it is convenient to use inorganic powders containing water of crystallization in an amount of at least 5 % by weight, preferably 10 to 65 % by weight, at room temperature.

Examples of the fire-proofness improving inorganic powders are powders of aluminum hydroxide, calcium hydroxide, clays, alum, hydrated gypsum, sodium sulfate hydrate, disodium phosphate hydrate. These can be used either alone or in combination. Aluminium hydroxide is especially preferred because of great effect of improving fire-proofness. These inorganic powders do not release water molecules at the time of foaming and curing the shaped article, but evolve water and absorb heat by evaporation when exposed to high temperatures such as during fire, thus improving the fire-proofness of the shaped article.

Accordingly, it is convenient to use inorganic powders which release water of crystallization only at temperatures above 120°C., but those which release it at below 120°C. may also be used. In this case, the temperature at which the shaped article is foamed and cured is made lower than the temperature at which water of crystallization is released.

The "inorganic powders which decompose and absorb heat when exposed to high temperatures" are those which endothermically decompose when exposed to high temperatures such as during fire, and as a result of absorption of heat, improve the fire-proofness of the shaped article. The amount of heat absorbed at this time should be at least 100 cal./g, preferably 110 – 1000 cal./g. Those inorganic powders which decompose at a temperature of at least 120°C., especially 200° to 900°C., are preferred. Such heat-decomposing inorganic powders include, for example, calcium carbonate, magnesium carbonate, zinc carbonate, cadmium carbonate, sodium nitrate, lead nitrate, aluminum sulfate, ammonium phosphate, ammonium carbonate and ammonium sulfate. They can be used either alone or in combination. Calcium carbonate is most preferred because of its good endothermic effect and low cost.

Since these heat-decomposing inorganic powders decompose and absorb heat only when the shaped article is exposed to high temperatures such as fire and thus play a role of increasing the fire-proofness of the shaped article, they should not decompose at the foaming and curing temperature of the shaped article, that is, at temperatures of 15° to 120°C.

Accordingly, the heat-decomposing inorganic powders preferably have a heat-decomposition temperature of above 120°C. Inorganic powders having a heat decomposition temperature of below 120°C. can also be used, but in this case the foaming and curing temperature of the shaped article should be made lower than the heat-decomposition temperature of the inorganic powders.

The fire-proof improving agents may be used either alone or in combination, and amount of the fire-proof improving agent is up to 80 parts by weight per 100 parts by weight of the total amount of components (a), (b) and (c) described above. The preferred amount is 10 to 50 parts by weight.

The mixture consisting of the constituents described above may further include various additives conventionally used in non-combustible architectural materials, such as inorganic pigments or fillers (glass beads, borax powders, etc.).

The above constituents are uniformly mixed by customary means to provide the composition according to the present invention. For example, silicon or silicon alloy powders, a light-weight filler and a fire-proofness improving agent and if desired, further a fibrous substance are mixed by a concrete mixer, and water glass is sprayed onto the mixture. The uniformly mixed composition is then shaped by various methods such as casting, press-forming or extrusion. Such shaping methods which exert compression force resulting in substantial breakage of the porous or hollow structure of the porous or hollow inorganic powders should be avoided.

It has been found that according to this invention the mixture is suitably shaped by compression to an extent such that the bulk density of the mixture is 1.5 to 12 times, preferably 2 to 10 times, that before compression. By the term "bulk density", as used herein, is meant the weight of the mixture per unit apparent volume.

The article obtained by such a compression molding and having a bulk density 1.5 to 12 times that before compression molding has high compression strength, and it is a non-combustible shaped article in which the porous structure of the inorganic powders is not substantially collapsed.

Shaping of the mixture should preferably be carried out such that the shaped article has a bulk density of 0.1 to 1.0, preferably 0.3 to 0.8. This bulk density range, however, is not critical, but may vary according to the amounts of various additives, fibrous material and fireproofness improving agent.

The form of the shaped article is, for example, a plate, rod, or cylinder, and may be any variety desired.

The shaped article can be foamed and cured by maintaining it at a temperature of 15° to 120°C. The suitable temperature of foaming and curing varies depending upon the composition, size and shape, etc. of the shaped article, but can be usually in the range of 20° to 50°C. When the fire-proofness improving agent described above is used, the temperature should be selected so that the fire-proofness improving agent will not be dehydrated or heat-decomposed.

By maintaining the shaped article at the above-mentioned temperature, water glass in the shaped article is hydrolyzed to liberate alkali hydroxide and sol-like acidic alkali silicate. This alkali hydroxide reacts with silicon powders or silicon present in silicon alloy powders to yield water glass. At the same time, hydrogen gas contributing to the foaming of the shaped article is generated to foam the shaped article. This reaction is an exothermic reaction, and by the generation of heat, water in water glass is gradually evaporated, and water vapor contributes to the foaming of the shaped article together with hydrogen gas. Finally, the shaped article is cured by this procedure.

The time required until the above-described reaction starts varies according to the bulk density or shape, especially thickness, of the shaped article, but usually 90 minutes at 35°C., 45 minutes at 45°C., 20 minutes at 60°C., 15 minutes at 80°C., and about 10 minutes at 100°C. The duration of the reaction is usually from 2 to 3 minutes. Since it is an exothermic reaction, it propagates acceleratingly once the reaction starts partly, and ends within short periods of time.

The curing of the shaped article proceeds rapidly by maintaining it at a temperature within the range of 15° to 120°C. This leads to a cured non-combustible shaped article having good appearance free from any unevenness or cracks ascribable to the eruption of hydrogen gas.

Foaming of the shaped article is mild and hardly requires control. If, however, it is desired to control the extent of foaming, the temperature of foaming and curing is lowered, or the shaping and foaming and curing are performed within a press-forming apparatus and the compressing pressure is controlled at this time. Other methods of controlling the extent of foaming will be apparent to those skilled in the art.

Uniform mixing of the constituents of the mixture, the shaping of the mixture, and the foaming and curing of the shaped article may be performed continuously or batchwise using a molding machine such as a press-forming apparatus.

We have found a method of producing the non-combustible shaped article continuously using a specified belt-type compression roller.

Accordingly, in another aspect of this invention, there is provided a process for continuously producing a non-combustible light-weight shaped article which comprises compression molding the mixture composed of the abovementioned constituents (a), (b) and (c), and if desired, (d) and/or (e) by feeding it into a compression space formed between an endless belt the inside surface of which contacts compression rolls and a feed plate moving at substantially the same speed as the endless belt and in the same direction as the movement of the endless belt, to an extent such that the bulk density of the compressed article is 1.5 to 12 times that of the shaped article before compression, and introducing the shaped article into reaction chambers maintained at a temperature of 15° to 120°C. thereby to foam and cure the shaped article.

The continuous manufacture of the non-combustible light-weight shaped article in accordance with the present invention can be carried out advantageously using an apparatus shown in the attached drawings in which.

A shaping material 2, which is a mixture composed of silicon or silicon alloy powders, porous or hollow inorganic powders and water glass and optionally together with the fibrous material and/or fire-proofness improving agent and/or various additives, is stored in a hopper 1. Compression rollers 3 to 10 for compressing the shaping material 2 are provided in contact with the inside surface of an endless belt 11 in spaced-apart relationship at progressively lower positions in the direction farther from the hopper. Reference numerals 12 and 13 designate drive rollers, and reference numerals 14 to 16 represent belt-guiding rollers. The compression rollers 3 to 10, the drive rollers 12 and 13 and the belt guide rollers 14 to 16 all touch the inside surface of the endless belt 11. The endless belt 11 moves in the direction of the arrow in FIG. 1 by the rotation of the drive rollers 12 and 13. At the part where the compression rollers 3 to 10 are provided, the belt surface of the endless belt 11 gradually compressed the shaping material 2 fed from the hopper 1 while moving it. The taut state of the endless belt 11 is adjusted by the guide rollers 14 to 16, and the zigzag movement of the endless belt 11 is prevented. Beneath the endless belt 11 is disposed a feed plate 17 which moves at substantially the same speed as the endless belt 11 in the direction of movement of the endless belt 11. The feed plate 17 is adapted to be moved by a drive roller 19 on a plurality of support rollers 18.

Figure 1:
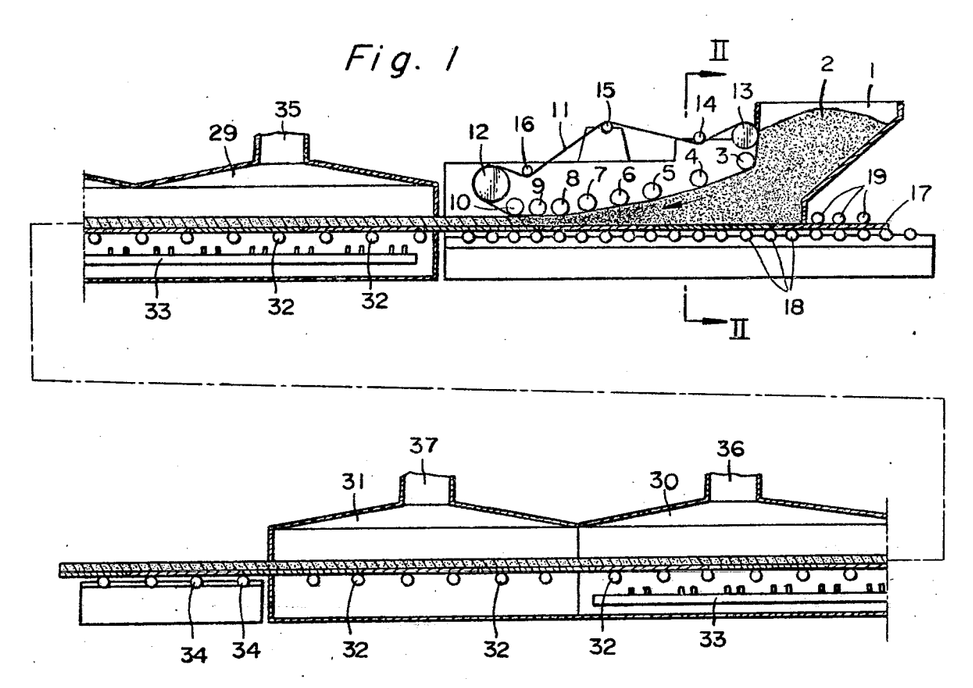
FIG. 1 is a sectional view showing the outline of one example of an apparatus for use in the production of the non-combustible shaped article in accordance with the present invention.

The feed plate 17 may be constructed of a hard flat plate, but may also be an endless belt supported by a plurality of rollers. In this case, the endless belt as the feed plate 17 is removed in the same direction as the endless belt 11 at the roller part. Also, the feed plate 17 may be constructed of a plurality of long plates, in which case these plates are continuously fed onto the support rollers 18.

Figure 2:
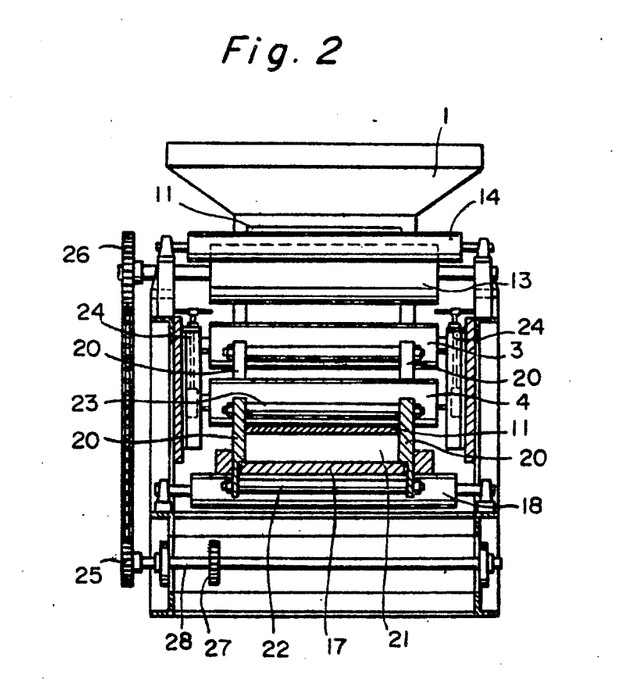
FIG. 2 is a sectional view taken on the line II—II of FIG. 1 seen in the direction of the arrow.

As shown in FIG. 2, wall plates 20 are provided erectingly in an opposing fashion to cover both lateral ends of the endless belt 11 at the parts of the compression rollers 3 to 10 and the drive rollers 12 and 13, both lateral ends at the lower part of the endless belt 11, and both lateral ends of the hopper 1, thereby to form a compression space 21 between the endless belt 11, the feed plate 17 and the hopper 1.

The compression space 21 is progressively diminished in size farther away from the side of the hopper 1 because the compression rollers 3 to 10 are positioned progressively downwards. Thus, the sectional area of the compression space 21 is progressively diminished from the position of the compression roller 3 towards the position of the compression roller 10. The preferred ratio of the sectional area of the compression space 21 at the position of the compression roller 10 to that at the position of the compression roller 3 is in the range of 1/20 to ⅓, especially 1/10 to ¼. If the ratio of the sectional area is less than 1/20, the compression force becomes excessively large to collapse the porous inorganic powders in the shaping material, and a light-weight shaped article may sometimes be not obtained. If this ratio is larger than ⅓, the compression force is too small, and the shaped article tends to be disintegrated by impact. Furthermore, the resulting non-combustible shaped article has poor strength, and open-celled pores occur in the shaped article to tend to reduce the fire-proofing performance of the shaped article.

When the above-mentioned sectional ratio is between 1/20 and ⅓, the shaping material can be shaped to an extent that the compressed material has a bulk density 1.5 to 12 times that before compression.

It is necessary that first several compression rollers near the hopper 1 should be provided at progressively lower positions in the direction farther away from the hopper. But the last compression roller 10 and the adjacent compression roller 9 or several other compression rollers adjacent thereto are arranged in the same plane, so as to shape the shaping material into a flat plate. In FIG. 1, the shaping material is compressed by compression rollers 3 to 8, and shaped into a plate by the compression rollers 9 and 10.

In FIG. 2, reference numerals 22 and 23 represent bolts for fixing wall plates 20, and the vertical position of the compression roller 4 is adjusted by adjusting devices 24 which move the compression roller 4 up and down. Power from a motor is transmitted to a sprocket 27 secured to a shaft 28, which in turn transmits power to sprockets 25 and 26 to drive the endless belt 11.

The molded article produced by compression and molding between the feed plate 17 and the compression rollers 3 to 10 within the compression space 21 is introduced into reaction chambers 29, 30 and 31. In each of the reaction chambers, a plurality of conveyor rollers 32 are provided. By the passage of the feed plate 17 through the reaction chambers 29, 30 and 31 by the conveyor rollers 32, the shaped article fed from the compression space 21 successively passes through the reaction chambers. The reaction chambers 29 and 30 include a pipe 33 for supplying a heating or cooling medium, for example hot or cold air to adjust the temperature of the chambers to 15°– 120°C.

Within the reaction chambers, alkali hydroxide formed by the hydrolysis of water glass within the shaped article reacts with silicon or silicon in the silicon alloy to evolve hydrogen gas which causes the foaming of the shaped article. By the foaming of the shaped article and the evaporation of water, the shaped article is cured to the desired non-combustible shaped article.

The reaction chambers 29, 30 and 31 include exhaust ducts 35, 36 and 37 respectively in order to avoid the risk of explosion by hydrogen gas. The shaped article which has been foamed and cured is delivered from the reaction chamber 31 and received by a conveyor roll 34. The resulting non-combustible shaped article is then out to the desired sizes to provide a final product.

Thus, according to the present invention, there can be obtained a non-combustible light-weight shaped article having high mechanical strength characteristics such as flexural strength or compression strength and superior thermal and water resistance, which does not disintegrate by impact and in which the porous or hollow inorganic powders are not substantially destroyed.

The non-combustible shaped article containing the fire-proofing improving agent in accordance with the process of the present invention is not only light in weight and non-combustible, but also has excellent fireproofness. When flame is applied to the non-combustible shaped article to heat it to high temperatures in order to test its fire-proof performance, no changes detrimental to fire-proofing or structure, such as distortion, destruction or falling-off, occur. Cracks through which flame passes neither occur. The temperature of the back of the heated surface is not raised so much although depending upon the thickness of the shaped article, and such is effective for maintaining good fire-proofness. Furthermore, flames or smokes do not occur during the heating of the shaped article according to this invention, and after heating, fire disappears within short periods of time.

According to the process of the present invention, a non-combustible light-weight shaped article of good appearance can be produced simply and with good efficiency by the continuous shaping procedure.

The shaped article obtained by this invention is easy to saw and nail, and can be used by the same building method as with wood. Therefore, it has very high utility as a structural material requiring non-combustibility, such as roofing material, ceiling material, floor material, interior and exterior wall material decorative material, and furniture.

The invention will be illustrated by the following Examples in which all parts are by weight unless otherwise specified. The various properties appearing in the Examples were measured by the following emthods.

NON-COMBUSTIBILITY

The sample is burned for 3 minutes with a city gas burner with an air supply rate of 1.5 liters per minute, and then heated additionally by a nichrome wire heater of 1.5 Kw/h. for 17 minutes. Smoke flame and residual flame were observed, and by a synthetic evaluation of all these items, the non-combustibility of the sample is determined.

FLEXURAL STRENGTH

JIS A1408

COMPRESSION STRENGTH

JIS A1108

FIRE-PROOF PERFORMANCE

JIS A1304 (method of fire-proof test for architechtural structure); heating time 1 or 2 hours.

WATER RESISTANCE

The sample is immersed for 48 hours in hot water at 80°C. The flexural strength of the sample before immersion is compared with that after immersion to evaluate the water resistance of the sample.

EXAMPLE 1

| | |
|---|---|
| Ferrosilicon (smaller than 325 microns) | 100 parts |
| Pumice microballoon (smaller than 500 microns) | 300 parts |
| Asbestos (fiber length less than 30 mm) | 60 parts |
| Water glass (No. 3) | 200 parts |

A mixture consisting of the above ingredients was subjected to a kneader and well kneaded. The kneaded mixture was put into a mold having a size of 150 × 150 × 50 mm, and was foamed and cured at a pressure of 50 Kg/cm$^2$ in a press-forming machine having a press plate heated at 100°C. The plate-like shaped article obtained was thoroughly dried, and its flexural strength, compression strength and bulk density were measured. The results are shown below, and indicate that the shaped article has excellent flexural and compression strengths, and is light in weight and non-combustible.

| | |
|---|---|
| Bulk density (apparent) | 0.95 |
| Flexural strength | 105 Kg/cm$^2$ |
| Compression strength | 180 Kg/cm$^2$ |
| Water resistance | 105 Kg/cm$^2$ (before treatment with hot water) |
| | 102 Kg/cm$^2$ (after treatment with hot water) |
| Non-combustibility | excellent |
| Thermal resistance | thermally stably up to 750°C. |

EXAMPLE 2

Each of the following mixtures (Samples Nos. 1, 2 and 3) was treated in quite the same manner as in Example 1. The physical properties of the resulting shaped articles are shown in Table 1 below.

| | |
|---|---|
| Sample No. 1 | |
| Calcium silicide (smaller than 325 microns) | 100 parts |
| Obsidian pearlite (smaller than 500 microns) | 300 parts |
| Asbestos (fiber length less than 30 mm) | 90 parts |
| Water glass (No. 3, JIS standard) | 300 parts |
| Sample No. 2 | |
| Ferrosilicon (smaller than 325 microns) | 100 parts |
| Pearlite rock (smaller than 500 microns) | 150 parts |
| Asbestos (fiber length less than 30 mm) | 60 parts |
| Water glass (No. 3, JIS standard) | 100 parts |
| Sample No. 3 | |
| Ferrosilicon (smaller than 325 microns) | 100 parts |
| Pumice microballoon (smaller than 500 microns) | 300 parts |
| Water glass (No. 3, JIS standard) | 200 parts |

Table 1

| Properties | Sample No. 1 | Sample No. 2 | Sample No. 3 |
|---|---|---|---|
| Apparent bulk density | 1.0 | 0.8 | 0.8 |
| Flexural strength (Kg/cm$^2$) | 89 | 68 | 38 |
| Compression strength (Kg/cm$^2$) | 185 | 99 | 140 |
| Water resistance (Kg/cm$^2$) | | | |
| Before treatment with hot water | 89 | 68 | 38 |
| After treatment with hot water | 87 | 66 | 35 |
| Non-combustibility | excellent | excellent | excellent |
| Thermal resistance (thermally stable up to the temperatures indicated) | 710°C. | 710°C. | 1150°C. |

EXAMPLE 3

| | |
|---|---|
| Ferrosilicon (less than 325 microns) | 100 parts |
| Pearlite rock (100 – 1000 microns) | 600 parts |
| Water glass (No. 3, JIS standard) | 500 parts |
| Asbestos (fiber length less than 30 mm) | 60 parts |

A mixture composed of the above ingredients was sufficiently kneaded in a kneader. This mixture had a bulk density of 0.116.

The mixture obtained was continuously processed using an apparatus of the type shown in FIGS. 1 and 2 of the accompanying drawings.

The mixture was fed continuously from the hopper 1 into a compression space formed between the endless belt 11 and the feed plate 17 moving in the direction of movement of the endless belt at substantially the same speed as the endless belt. The ratio of the cross sectional area of the compression space at the position of the compression roller 3 to that at the position of the compression roller 10 was adjusted to 8:1, and the mixture was compressed to a bulk density of 0.61 to form a plate-like shaped article having a thickness of 31.5 mm.

The shaped article was introduced into reaction chambers into which heated air at 80°C. was being blown. Water glass in the shaped article was hydrolyzed, and the generated sodium hydroxide reacted with silicon to evolve hydrogen gas, which in turn caused the foaming of the shaped article. The shaped article was thus cured within the reaction chambers.

The cured shaped article obtained had excellent non-combustibility and had a flexural strength of 32 Kg/cm$^2$, a compression strength of 30 Kg/cm$^2$ and an apparent bulk density of 0.55. It also had excellent thermal and water resistance.

The resulting shaped article was suitable for use as wall and ceiling materials.

EXAMPLE 4

Each of the mixtures (Samples Nos. 4 to 6) was processed by the same procedure as in Example 3 except that the shaping conditions shown in Table 2 were employed. The properties of the shaped articles obtained are shown in Table 2.

| Sample No. 4 | |
|---|---|
| Ferrosilicon (less than 325 microns) | 100 parts |
| Obsidian pearlite (500 – 1000 microns) | 700 parts |
| Water glass (No. 3, JIS standard) | 200 parts |
| Sample No. 5 | |
| Metal silicon powders (less than 325 microns) | 100 parts |
| Pearlite rock (100 – 1000 microns) | 1300 parts |
| Water glass (No. 3, JIS standard) | 1200 parts |
| Sample No. 6 | |
| Ferrosilicon (less than 325 microns) | 100 parts |
| Glass microballoon (50 – 100 microns) | 1400 parts |
| Water glass (No. 3, JIS standard) | 500 parts |
| Asbestos fibers (average fiber length 20 mm) | 100 parts |

Table 2

| | Sample No. 4 | Sample No. 5 | Sample No. 6 |
|---|---|---|---|
| Shaping conditions | | | |
| Bulk density of the mixture before shaping | 0.250 | 0.10 | 0.20 |
| Ratio of the cross sectional area of the compression space at roller 3 to that at roller 10 in Figure 1 | 6/1 | 6/1 | 6/1 |
| Bulk density of the mixture after shaping | 0.75 | 0.45 | 0.45 |
| Thickness of the shaped article (mm) | 30.5 | 31 | 30 |
| Temperature of reaction chambers (°C) | 80 | 18 | 80 |
| Properties of the shaped article | | | |
| Apparent bulk density | 0.68 | 0.41 | 0.66 |
| Flexural strength (Kg/cm$^2$) | 50 | 25 | 60 |
| Compression strength (Kg/cm$^2$) | 90 | 25 | 90 |
| Non-combustibility | excellent | excellent | excellent |
| Water resistance (Kg/cm$^2$) | 45 | 20 | 56 |
| Thermal resistance (thermally stable up to the temperatures indicated | 750°C. | 750°C. | 750°C. |
| Thickness (mm) | 30 | 30 | 29.5 |

EXAMPLE 5

| Ferrosilicon (less than 325 microns) | 100 parts |
|---|---|
| Pearlite rock (less than 500 microns) | 660 parts |
| Aluminum hydroxide | 600 parts |
| Water glass (No. 3, JIS standard) | 540 parts |
| Asbestos (fiber length less than 30 mm) | 100 parts |

A mixture composed of the above ingredients (bulk density 0.24) was put into a mold having a size of 900 mm × 900 mm × 47 mm, and shaped at a pressure of 27 Kg/cm$^2$. The shaped article had a bulk density of 0.79. The shaped article obtained was withdrawn from the mold. Sodium hydroxide generated by the hydrolysis of water glass reacted with silicon present in the ferrosilicon to evolve hydrogen gas, whereby the shaped article was cured at 45°C. The shaped article had a bulk density of 0.71. The resulting shaped article had excellent non-combustibility, and no smoke, no flame and no residual flame were observed.

The resulting shaped article was examined for fireproofness. When the heating time was 2 hours and the temperature of the heated surface of the shaped article was 1010°C., the maximum temperature of the back surface was 245°C. Furthermore, during heating, no distortion, no destruction or no falling-off was observed, and no cracks occurred. After heating, flame disappeared instantly. Analysis of the sample after testing showed that aluminum hydroxide was converted to aluminum oxide by dehydration.

The shaped article obtained had an apparent bulk density of 0.65, a flexural strength of 22 Kg/cm$^2$ and a compression strength of 28 Kg/cm$^2$. It was also excellent in water resistance, and was suitable for use as structural materials such as ceilings or walls.

EXAMPLE 6

Each of the following mixtures (Samples Nos. 7 to 11) was processed in the same way as in Example 5 except that the shaping conditions shown in Table 3 were employed. The properties of the shaped articles obtained are shown in Table 3.

| Sample No. 7 | |
|---|---|
| Ferrosilicon aluminum (less than 325 microns) | 100 parts |
| Obsidian pearlite (less than 500 microns) | 600 parts |
| Calcium silicate hydrate (less than 100 microns) | 320 partrs |
| Water glass (No. 3, JIS standard) | 500 parts |
| Asbestos (fiber length less than 31 mm) | 80 parts |

| Sample No. 8 | |
|---|---|
| Ferrosilicon (less than 325 microns) | 100 parts |
| Pearlite rock (less than 500 microns) | 540 parts |
| Disodium phosphate hydrate (less than 100 microns) | 290 parts |
| Water glass (No. 3, JIS standard) | 430 parts |
| Rock wool (fiber length less than 30 mm) | 70 parts |

| Sample No. 9 | |
|---|---|
| Calcium silicide (less than 325 microns) | 100 parts |
| Pumice microballoon (less than 500 microns) | 300 parts |
| Calcium carbonate (less than 100 microns) | 175 parts |
| Amosite asbestos (fiber length less than 10 mm) | 100 parts |
| Water glass (No. 3, JIS standard) | 200 parts |

| Sample No. 10 | |
|---|---|
| Metal silicon powders (less than 325 microns) | 100 parts |
| Obsidian pearlite (less than 500 microns) | 400 parts |
| Hydrated gypsum (less than 100 microns) | 200 parts |
| Water glass (No. 2, JIS standard) | 300 parts |

| Sample No. 11 | |
|---|---|
| Metal silicon powders (less than 325 microns) | 100 parts |
| Obsidian pearlite (less than 500 microns) | 500 parts |
| Ammonium phosphate (less than 100 microns) | 250 parts |
| Water glass (No. 3, JIS standard) | 400 parts |

Table 3

| | Samples Nos. | | | | |
|---|---|---|---|---|---|
| | 7 | 8 | 9 | 10 | 11 |
| Shaping conditions | | | | | |
| Bulk density of the mixture before shaping | 0.21 | 0.13 | 0.19 | 0.22 | 0.21 |
| Size of the mold (mm) | 900 × 900 × 38 | 900 × 900 × 37 | 900 × 900 × 40 | 900 × 900 × 35 | 900 × 900 × 40 |
| Compression force at time of shaping (Kg/cm$^2$) | 26 | 20 | 15 | 30 | 35 |
| Bulk density of the shaped mixture | 0.70 | 0.63 | 0.68 | 0.71 | 0.81 |
| Reaction temperature (°C) | 45 | 45 | 45 | 45 | 45 |
| Properties of the shaped article | | | | | |
| Apparent bulk density | 0.64 | 0.57 | 0.60 | 0.65 | 0.70 |
| Flexural strength (Kg/cm$^2$) | 20 | 26 | 12 | 14 | 20 |
| Compression strength (Kg/cm$^2$) | 28 | 31 | 15 | 23 | 30 |
| Non-combustibility | excellent | excellent | excellent | excellent | excellent |
| Water resistance (Kg/cm$^2$) | 18 | 23 | 10 | 11 | 16 |
| Heat insulating properties (Kcal/m hr °C) | 0.13 | 0.10 | 0.11 | 0.13 | 0.12 |
| Fire-proofness | | | | | |
| Heating grade (hr.) | 1 | 1 | 1 | 1 | 1 |
| Temperature of the heated surface (°C) | 925 | 925 | 925 | 925 | 925 |
| Maximum temperature of the back surface (°C) | 255 | 256 | 250 | 240 | 250 |
| Distortion, destruction, coming-off, and cracks | none | none | none | none | none |
| Results of analysis after the fire-proof test | calcium silicate hydrate was converted to calcium silicate | disodium phosphate hydrate was converted to disodium phosphate | calcium carbonate was decomposed to calcium oxide | hydrated gypsum was dehydrated to gypsum | ammonium phosphate was decomposed to ammonium salt |

All of the shaped articles obtained above, as is clear from the above table, were non-combustible without smoke, flame and residual flame, and had excellent fire-proofness. In the fire-proof test, flame was immediately disappeared after exposure to flames.

The shaped articles also had good water resistance, and were suitable for use as structural materials such as ceiling and wall materials.

What is claimed is:

1. A method of producing a non-combustible light weight shaped article, which consists essentially of shaping a mixture consisting essentially of:
   a. 100 parts by weight of powders of silicon or a silicon alloy containing at least 50% by weight of silicon,
   b. 100–200 parts by weight of inorganic powders having a porous or hollow structure,
   c. 100–1200 parts by weight of water glass,
   d. up to 80 parts by weight, per 100 parts by weight of the sum total of (a), (b) and (c), of a fibrous material and
   e. up to 80 parts by weight, per 100 parts by weight of the sum total of (a), (b), and (c), of a fire-proofness improving agent;

compressing the resulting shaped article until the bulk density of the shaped article is increased to 1.5 to 12 times that before shaping; and maintaining the resulting shaped article at a temperature of 15°–120°C. thereby to foam and cure it.

2. The method of claim 1 wherein said silicon alloy is selected from the group consisting of ferrosilicon, calcium silicide, ferrosilicon aluminum, silicon manganese aluminum, calcium silicon manganese, silicon manganese and silicochromium.

3. The method of claim 1 wherein said porous or hollow inorganic powders are selected from the group consisting of powders of pearlite rock, pumice microballoon, carbon micro-balloon, glass microballoon, foamed shale pumice, foamed clay and vermiculite.

4. The method of claim 1 wherein said mixture contains 1 to 10 parts by weight of the fibrous material, per 100 parts by weight of the sum total of (a), (b) and (c).

5. The method of claim 4 wherein said fibrous material is selected from the group consisting of chrysotile asbestos, hard serpentine asbestos, anthophyllite asbestos, amosite asbestos, tremolite asbestos, actinolite asbestos, crocidolite asbestos, rock wool, slag wool, glass fibers and metal fibers.

6. The method of claim 1 wherein said mixture contains 10 to 50 parts by weight of the fire-proofness improving agent per 100 parts by weight of the total amount of (a), (b) and (c).

7. The method of claim 6 wherein said fire-proofness improving agent is selected from the group consisting of (i) inorganic powders which contain water of crystallization and release it at high temperatures to form water vapor, (ii) inorganic powders which decompose and absorb heat at high temperatures, and (iii) a mixture of these powders.

8. The method of claim 7 wherein said inorganic powders (i) are selected from the group consisting of powders of aluminum hydroxide, calcium hydroxide, clays, alum, hydrated gypsum, sodium sulfate hydrate and disodium phosphate hydrate, and said inorganic powders, (ii) are selected from the group consisting of powders of calcium carbonate, magnesium carbonate, zinc carbonate, cadmium carbonate, sodium nitrate, lead nitrate, aluminum sulfate, ammonium phosphate, ammonium carbonate and ammonium sulfate.

9. A method of continuously producing a non-combustible light-weight shaped article which consists essentially of:
   1. compression molding a mixture consisting essentially of:
      a. 100 parts by weight of powders of silicon or a silicon alloy containing at least 50% by weight of silicon,
      b. 100–200 parts by weight of inorganic powders having a porous or hollow structure,
      c. 100–1200 parts by weight of water glass,
      d. up to 80 parts by weight, per 100 parts by weight of the sum total of (a), (b) and (c), of a fibrous material and
      e. up to 80 parts by weight, per 100 parts by weight of the sum total of (a), (b) and (c), of a fire-proofness improving agent by feeding it into a compression space formed between an endless belt, the inside surface of which contacts compression rolls and a feed plate moving at substantially the same speed as the endless belt and in the same direction as the movement of the endless belt, to an extent such that the bulk density of the compressed article is 1.5 to 12 times that of the shaped article before compression, and
   2. introducing the shaped article into reaction chambers maintained at a temperature of 15° to 120°C. thereby to foam and cure the shaped article.

10. The product produced by the process of claim 1.

* * * * *